April 18, 1950

J. JOZIF 2,504,265

TOOLBOX ARRANGEMENT IN MOTORCYCLES AND
SIMILAR VEHICLES

Filed Dec. 26, 1946

Patented Apr. 18, 1950

2,504,265

UNITED STATES PATENT OFFICE 2,504,265

TOOLBOX ARRANGEMENT IN MOTOR-CYCLES AND SIMILAR VEHICLES

Josef Jozíf, Prague, Czechoslovakia, assignor to Zbrojovka Brno, Brunn, Czechoslovakia Application December 26, 1946, Serial No. 718,581
In Czechoslovakia January 3, 1946

3 Claims. (Cl. 180—68.5)

The arrangement of the battery in motor cycles and similar vehicles presents certain difficulties, as it is necessary to protect the battery against shocks, as well as against dust, mud and rain and at the same time to avoid the other organs of the vehicle and the driver's clothes being spattered by the battery acid.

The hitherto familiar methods of arranging the battery on motor cycles do not sufficiently comply with such requirements. According to the present invention a suitable space for locating the battery is reserved inside the box which is conveniently arranged in the rear frame part sidewise of the rear wheel and serves as tool box. The inner space of said tool box is divided by one or more partitions into two or more independent and mutually separated spaces, one of which serves for locating therein the battery with the fuse and according to requirements other accessories too. The space provided for the battery will preferably be arranged with aerating apertures by cutting through and bending conveniently outwards the outer box wall at several points.

Figure 1:
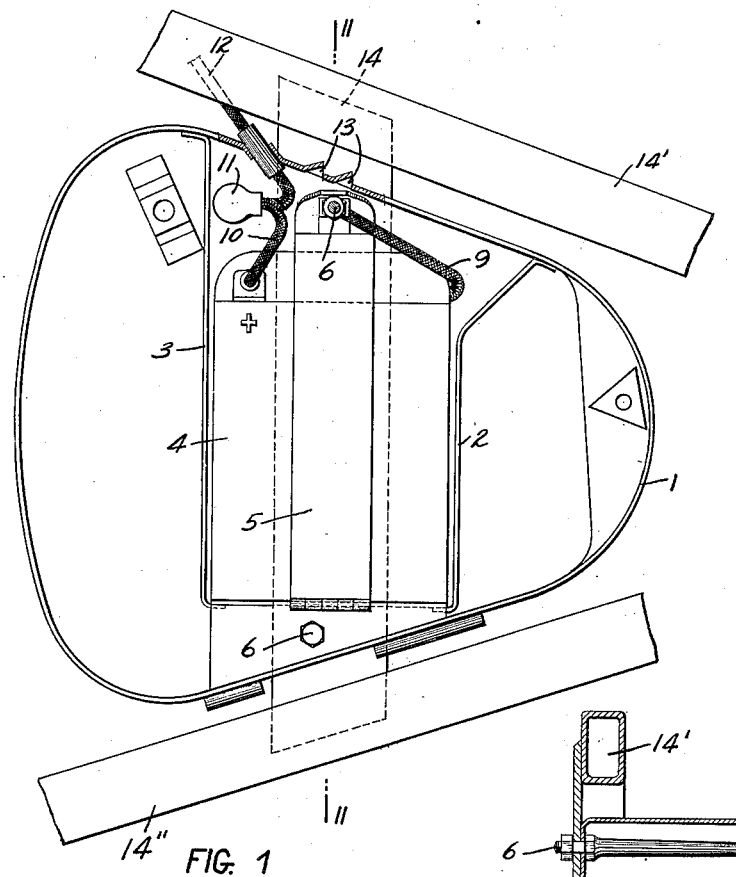
Figure 2:
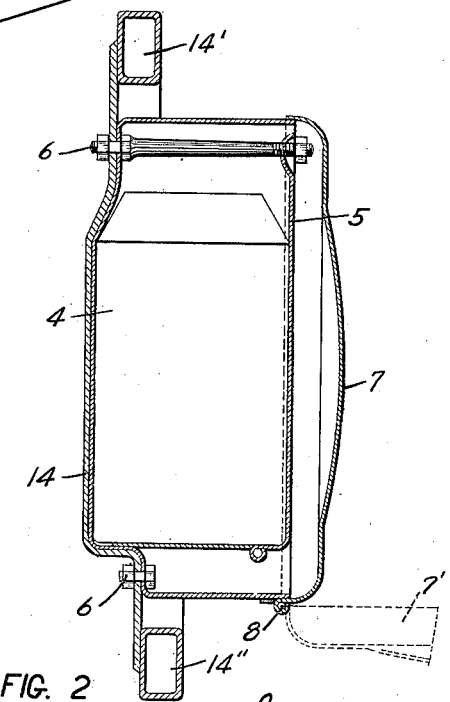

An embodiment of the arrangement according to the present invention will now be described merely by way of example with reference to the accompanying drawing, wherein Fig. 1 shows a longitudinal section of the box arranged according to the present invention, Fig. 2 shows a cross section on the line II—II in Fig. 1.

Referring now to the drawing, 1 indicates the tool box divided into three parts by the partitions 2 and 3 spot-welded inside the box. Both outer parts are for the tools or the like, whilst the middle part contains the battery 4 mounted firmly by means of the yoke member 5 and the screws 6 in the box 1. At the same time the screws 6 secure the box to a vertical plate 14 the upper and lower ends of which are fixedly secured, as by welding, to upper and lower tubular frame members 14' and 14'' respectively, of the motor cycle frame. The box is closed by a lid 7 hinged at 8, Fig. 2 showing the lid 7 in dotted line in open position.

The cable 9 is connected to the frame of the machine whilst cable 10 is attached through the fuse 11 with the outlet cable 12. The ventilating apertures 13 are formed by cutting through the walls of the box 1 and bending the cut pieces outwards and are serving for conveniently ventilating the space wherein the battery is placed.

In the embodiment illustrated the box space is divided by two partitions 2 and 3 into three compartments. It may be, however, preferable to provide only one partition dividing in two the inner space of the box, one compartment serving for locating therein the storage battery.

I claim:

1. The combination of a motor cycle having spaced upper and lower tubular frame members and a tool box having a vertical wall, a vertical plate connected permanently with its upper and lower ends to said upper and lower tubular frame members, means detachably securing the tool box with its vertical wall to said vehicle plate between the ends thereof, vertically extending partitions at right angles to said vertical wall in said tool box for forming a number of separate compartments therein, a wet storage battery in one of said compartments, and means for clampingly securing said battery against said vertical wall.

2. The combination of a motor cycle having spaced upper and lower tubular frame members and a tool box having a vertical wall, a vertical plate connected permanently with its upper and lower ends to said upper and lower tubular frame members, means detachably securing the tool box with its vertical wall to said vertical plate between the ends thereof, vertically extending partitions at right angles to said vertical wall in said tool box for forming a number of separate compartments therein, a wet storage battery in one of said compartments, and means for clampingly securing said battery against said vertical wall, said last named means being held in operative position by said detachable securing means.

3. The combination of a motor cycle having spaced upper and lower tubular frame members and a tool box having a vertical wall, a vertical plate connected permanently with its upper and lower ends to said upper and lower tubular frame members, means detachably securing the tool box with its vertical wall to said vertical plate between the ends thereof, at least one vertically extending partition at right angles to said vertical wall in said tool box for forming at least two separate compartments therein, a wet storage battery in one of said compartments, and means for clampingly securing said battery against said vertical wall.

JOSEF JOZÍF.

REFERENCES CITED

The following references are of record in the file of this patent:

UNITED STATES PATENTS

| Number | Name | Date |
|---|---|---|
| 1,995,797 | Clark | Mar. 26, 1935 |
| 2,229,756 | McCann et al. | Jan. 28, 1941 |